G. LINNERTZ.
APPARATUS FOR MAKING HEDDLE EYES.
APPLICATION FILED OCT. 9, 1911.
1,057,968.
Patented Apr. 1, 1913.
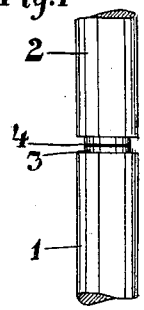
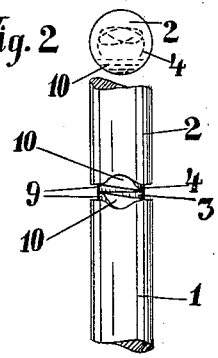
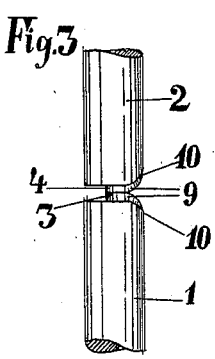
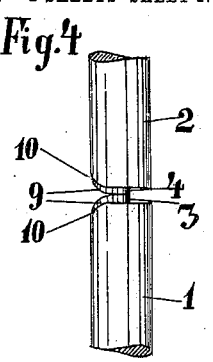
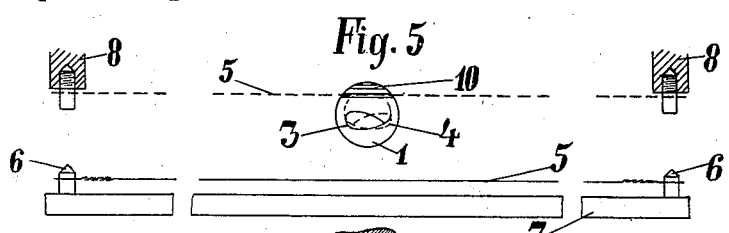
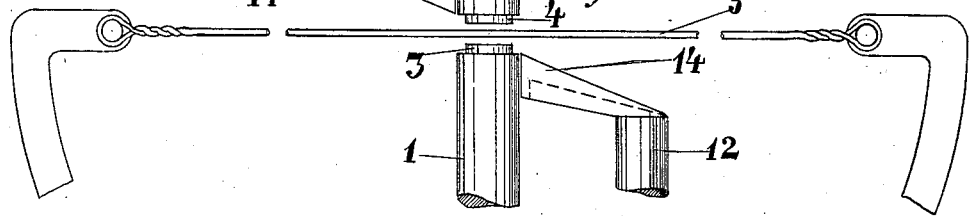
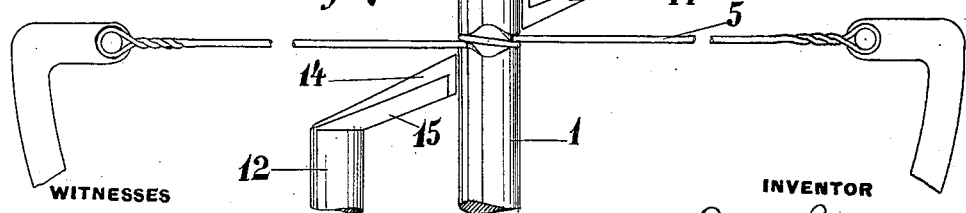

G. LINNERTZ.
APPARATUS FOR MAKING HEDDLE EYES.
APPLICATION FILED OCT. 9, 1911.
1,057,968.
Patented Apr. 1, 1913.
2 SHEETS—SHEET 2.
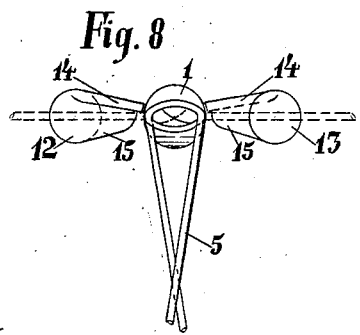
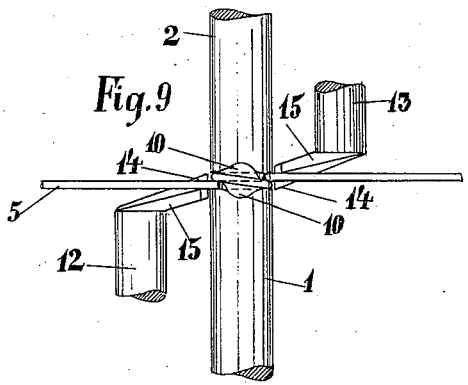
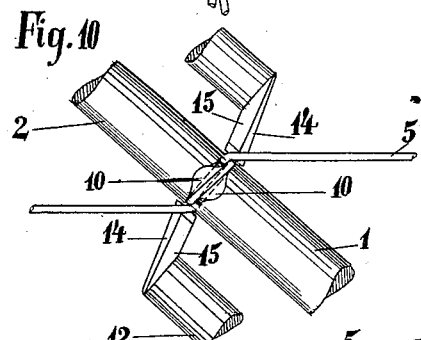
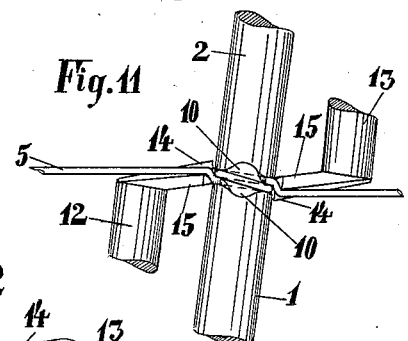
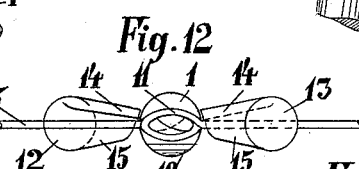
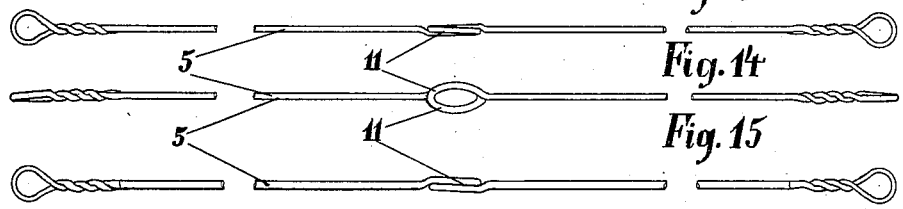
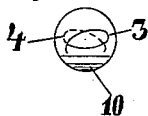
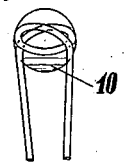
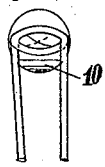
WITNESSES
R. A. Balderson
Jesse B. Heller
INVENTOR
Gustav Linnertz,
by Bakewell, Byrnes & Parmelee,
Attys.
COLUMBIA PLANOGRAPH CO., WASHINGTON, D. C.

UNITED STATES PATENT OFFICE.

GUSTAV LINNERTZ, OF ELBERFELD, GERMANY.

APPARATUS FOR MAKING HEDDLE-EYES.

1,057,968.  Specification of Letters Patent.  Patented Apr. 1, 1913.

Original application filed May 6, 1911, Serial No. 625,632. Divided and this application filed October 9, 1911. Serial No. 653,524.

*To all whom it may concern:*

Be it known that I, GUSTAV LINNERTZ, a subject of the Emperor of Germany, residing at 6 Ewaldstrasse, Elberfeld, Germany, have invented new and useful Improvements in Apparatus for Making Heddle-Eyes, of which the following is a specification.

This application is a division of my application Serial No. 625632, filed May 6th, 1911.

This invention relates to an improved apparatus for making heddle eyes from a single piece of steel wire.

In manufacturing these heddles of springy steel wire the production of the eye for the thread presents difficulties, inasmuch as the wire springs back after the eye has been formed by bending the wire over a mandrel which causes the eye to open. It has been attempted heretofore to obviate this drawback by subjecting the thread eye to a strong pressure after bending the wire. Heddles produced in this manner are found to be weakened at the portions adjacent to the eye, which is a serious defect more especially in the manufacture of fine fabrics.

The present invention is distinguished by the fact that the formation of the steel wire into the thread eye is effected exclusively by bending, thereby enabling heddles to be produced which can be used in the manufacture of very fine materials such as silk or the like. The heddle is thus bent and formed with an eye the axis of which is at right angles to the heddle and retains this position without any pressing operation being necessary.

The improved apparatus will now be described with reference to the accompanying drawings, in which:—

Figures 1 to 4 are a series of elevations each accompanied by a plan of the lower mandrel which shows the position from which the respective elevation is regarded. Fig. 5 is a sectional plan illustrating a wire blank in the act of being presented to the mandrel. Fig. 6 is an elevation of the wire blank after passing between the mandrel parts and before the latter have been brought together. Fig. 7 is a rear view of Fig. 6 after the mandrel parts have been brought together and the ends of the wire have been moved around through 180° in opposite directions. Fig. 8 is a plan of the lower mandrel part and of the wire blank when the ends of the latter have been moved through a little more than 270°. Fig. 9 is a view similar to Fig. 7 but showing certain abutments in operative position. Fig. 10 is a similar view but showing the mandrel rods and the abutments canted counter-clockwise. Fig. 11 is a similar view but showing the parts canted slightly in the clockwise direction. Fig. 12 is a plan of the lower mandrel and the abutments and shows the blank after it has been bent as shown in the previous figures. Figs. 13, 14 and 15 are different views of the finished heddle. Figs. 16 and 17 are plans illustrating certain relative positions of the alined mandrels at one stage of the bending process and Figs. 18 and 19 are plans illustrating different relative positions of the alined mandrels at another stage of the process the latter positions being attained by turning the mandrels relatively about the common axis. Figs. 20 and 21 are plans of the upper and lower parts respectively of the mandrel.

In Figs. 1 to 4, 1 and 2 are the mandrel rods, 3 and 4 are the mandrel parts corresponding in length to the thickness of the central eye or thread eye to be formed. The mandrel is thus divided in its middle and as seen in the drawing is adapted to receive two thicknesses of wire. In the plan views, Figs. 1 to 4 of the lower mandrel, the upper mandrel 4 is indicated in broken lines. Each mandrel is adapted to accommodate only one thickness of wire, so that the wire when formed into an eye lies with part of its upper surface against the shoulder above the upper mandrel, and with part of its opposite surface against the shoulder below the lower mandrel as seen in Fig. 7. This is facilitated by the provision of the inclined projections 9.

The abutments 12 and 13 which are employed as hereinafter described are provided each with a shoulder 14 for engaging the heddle wire in the horizontal direction at the parts adjoining the thread eye and with a shoulder 15 which during the bending operation serves as an abutment for the said parts in the vertical plane. These abutments are arranged one on either side of the mandrel and are movable in the direction of the axis of the mandrel.

The forming of a thread eye or central eye on a wire heddle blank is carried out in such manner that the mandrel around which the eye is bent is canted (after the formation of the thread eye) together with the two abutments first in one direction to the position shown in Fig. 10 and then, after moving the shoulders 15 against the wire, the mandrel and abutments are canted in the opposite direction to the position shown in Fig. 11, the ends of the heddle being secured laterally, whereby the thread eye may be displaced as desired with regard to the heddle ends.

The operation is as follows: The heddle wire blank 5 in which the thread eye is to be formed has its previously formed end eyes engaged with projecting pins 6 on a feed plate 7 and is transferred from the latter to two arms 8 by which it is carried during the formation of the thread eye. These arms 8 are adapted to swing about the longitudinal axis of the mandrel. In order to facilitate the insertion of the heddle wire between the rear portions of the mandrel rods, the mandrel rods may be provided with inclined surfaces 10. During the insertion of the heddle blank the two halves of the mandrel are moved sufficiently apart to enable the heddle to be passed between them as seen in Fig. 6 and the heddle wire is thus brought against the rear portion of the mandrel. The mandrel then closes as seen in Fig. 7 and the bending fingers 8 swing around the mandrel through about three quarters of a revolution and bring the wire ends to the position shown in Fig. 8. During the first part of this operation the surfaces of the mandrel which lie toward the rear parts 10 are in alinement as seen in Fig. 16 and form the rear part or side of the thread eye as seen in Fig. 17 but during the latter part of the said operation the mandrel parts turn slightly in relation to one another and their front surfaces come into alinement as seen in Fig. 18 and form the part of the loop as seen in Fig. 19. The abutments 12 and 13 are now advanced from the position seen in Fig. 7 to the position seen in Fig. 9 so that the shoulders 14 and 15 are in the supporting position and the arms 8 then return holding the wire under tension. During this return movement of the arms 8 the parts of the wire adjacent to the thread eye are supported in the horizontal direction by the shoulder 14. Simultaneously with the return movement of the arms the mandrel together with the abutments is canted first in the one direction to the position seen in Fig. 10 and the shoulders 15 are then brought close against the heddle wire. The mandrel together with the abutments is now canted in the other direction to the position seen in Fig. 11. By the tilting or canting in two opposite directions and by the aid of the abutments the thread eye is displaced as desired in relation to the two wire ends. The canting is carried out in both directions somewhat beyond the amount which is apparently necessary so that upon the return of the mandrel the eye assumes exactly the required position relatively of the heddle ends and also remains in this position. In this manner the heddle eye is completely formed without any compression of the wire, and it is therefore only necessary to solder the ends of the eye in order to finish the heddle.

I claim:

1. A two-part mandrel for forming the eyes of wire heddles, comprising two rods of relatively large diameter, a projecting mandrel part of smaller diameter on the end of each rod, merging inclined surfaces on the ends of each rod and on said mandrel parts, and wire blank carriers rotatable about said rods.

2. A two-part mandrel for forming the eyes of wire heddles, comprising two rods of relatively large diameter, a projecting mandrel-part of smaller diameter on the end of each rod, axially reciprocable abutments arranged one on either side of the rods, the abutment on one side having a downwardly extending abutting surface and the abutment on the other side having an upwardly extending abutting surface, said abutments being adapted to move from opposite points to a position opposite the eye of the heddle, and wire-blank carriers rotatable about said rods.

3. A two-part mandrel for forming the eyes of wire heddles, comprising two rods of relatively large diameter, a projecting mandrel-part of smaller diameter on the end of each rod, axially reciprocable abutments arranged one on either side of the rods; said abutments each having lateral and vertical abutment surfaces and being adapted to move from opposite points into engagement with the wire blank, and wire-blank carriers adapted to engage end eyes of the heddles and to rotate in opposite directions around said mandrel.

4. A two-part mandrel for forming the eyes of wire heddles, comprising two rods of relatively large diameter, a projecting mandrel-part of smaller diameter on the end of each rod, each mandrel part being adapted to oscillate relatively about the longitudinal axis in order to form respectively opposite sides of said eye, and wire-blank carriers adapted to engage end eyes of the heddles and to rotate in opposite directions around said mandrel.

5. A two-part mandrel for forming the eyes of wire heddles, comprising two rods formed with annular shoulders at their ends, abutments arranged one on either side of said rods and having respectively upwardly and downwardly presented abutment surfaces, said abutments being adapted to move axially from opposite points toward said mandrel, and wire-blank carriers rotatable about said mandrel; said mandrel and abutments being adapted to be canted in company and in relation to said carriers.

In testimony whereof I have signed my name to this specification in the presence of two subscribing witnesses.

GUSTAV LINNERTZ. [L. S.]

Witnesses:
ALBERT I. NUFER,
L. NUFER.

Copies of this patent may be obtained for five cents each, by addressing the "Commissioner of Patents, Washington, D. C."